A. AND H. INGRAM.
CLOSURE FOR JARS, BOTTLES, AND OTHER RECEPTACLES.
APPLICATION FILED APR. 24, 1918.

1,353,397. Patented Sept. 21, 1920.

Inventor
ALFRED INGRAM
HARRY INGRAM
By their Attorney

UNITED STATES PATENT OFFICE.

ALFRED INGRAM AND HARRY INGRAM, OF BROOKLYN, NEW YORK, ASSIGNORS TO INGRAMS INCORPORATED, OF BROOKLYN, NEW YORK, A CORPORATION OF NEW YORK.

CLOSURE FOR JARS, BOTTLES, AND OTHER RECEPTACLES.

1,353,397.     Specification of Letters Patent.    Patented Sept. 21, 1920.

Application filed April 24, 1918. Serial No. 230,386.

*To all whom it may concern:*

Be it known that we, ALFRED INGRAM and HARRY INGRAM, citizens of the United States, and residents of Brooklyn, in the county of Kings and State of New York, have invented certain new and useful Improvements in Closures for Jars, Bottles, and other Receptacles, of which the following is a specification.

This invention relates to improved means for closing the tops of tumblers, jars, bottles and other receptacles by means of applied caps and gaskets, which, in accordance with our invention, may be held in sealing position either by atmospheric pressure, that is, by what is commonly known as the vacuum sealing process, or merely by the gripping action of the gasket when it is in position surrounding the upper side wall of the receptacle.

The present application is a continuation in part of our application, Serial No. 178,595, filed July 5, 1917.

The essential characteristics of our improved form of gasket are that it shall be of yielding, and preferably of rubber-like, material in the form of a band surrounding the upper side wall of the receptacle, and shall be of such shape that a portion of it will normally project into the path of the side wall of the receptacle as the cap and gasket are being applied to the receptacle.

The essential characteristic of the cap is that it shall have an annular depending portion surrounding the gasket so that, with the gasket, it may coöperate in effecting a seal against the upper side wall of the receptacle.

Figure 1:
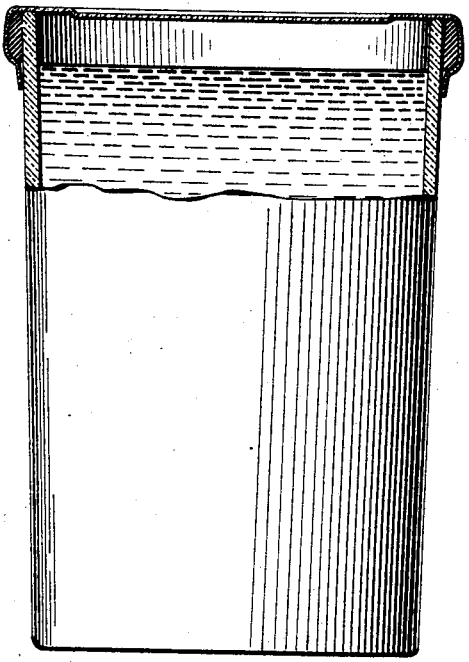
Figure 1 is a side elevation partly in section illustrating a receptacle with the cap and gasket applied thereto.
Figure 3:
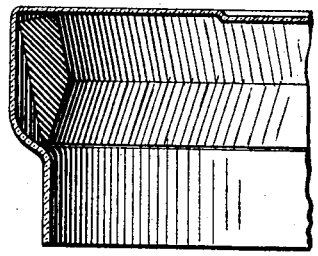
Fig. 3 is an enlarged section through one side portion of one form of cap and gasket before they have been applied to the receptacle.

If the cap is made of non-flexible material, as it may be, the gasket should be so formed with reference to the shape of the depending portion of the cap that, before the gasket and cap are placed in position on the receptacle, there will be a space between the outer wall of the gasket and the inner wall of the annular depending portion of the cap, as is illustrated generally in Fig. 3 with reference to the one form of cap and the one form of gasket there shown. This is for the reason that the gasket is usually made of rubber, which is a comparatively incompressible substance, and, in order that the cap and gasket when placed in position on the receptacle shall effect a seal against the upper side wall of the receptacle and not be forced up between the cap and the upper edge, or mouth, of the receptacle, a space must normally exist in the depending portion of the cap into which the gasket may be forced when it is deformed by the receptacle pressing outward on the projecting portion of the gasket, when the cap and gasket are put in place over the mouth of the receptacle, as illustrated in Fig. 1.

Figure 2:
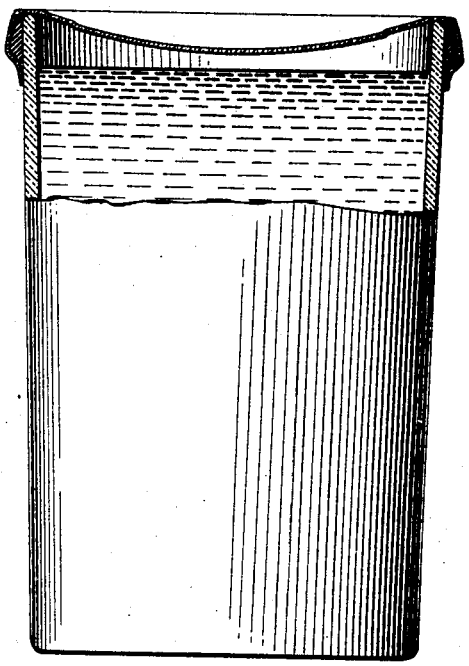
Fig. 2 is a corresponding view partly broken away, illustrating the relation of the parts when the cap is made of flexible material and the vacuum seal is effected.

If the cap is made of flexible material, the shape of the gasket and of the depending portion of the cap may be such that the gasket normally fits the depending portion of the cap, in which case, when the cap and gasket are forced into position on the receptacle, the pressure of the receptacle on the gasket, a portion of which normally extends in the path of movement of the receptacle, may deform the gasket and force it sidewise, expanding the material of the cap. Whether or not the gasket normally snugly fits the annular depending portion of the flexible cap, the seal may be made still more perfect if atmospheric pressure is used, which will deform or draw the flexible cap, somewhat as illustrated in Fig. 2, this being effected by creating a partial vacuum in the receptacle and allowing the then preponderating atmospheric pressure to act, as described in our pending application Serial No. 114,091, filed August 10, 1916.

The preferred form of our gasket is that shown in cross section in Fig. 3, and a convenient and economical way of making it is to cut a gasket from a tube of packing material, such as rubber, in the shape of a ring or band, and, in doing so, to turn off one side of the ring or band to form a bevel at that edge, which bevel is on the outer side of the ring or band as it is thus cut; the ring or band is then turned inside out so that its beveled lower edge will incline downwardly and outwardly and stand in the path of the edge of the receptacle upon which the cap and gasket are to be applied, as illustrated in Fig. 3. There are obviously other ways of forming the gasket, and any means may be resorted to which results in producing a gasket, the lower portion of which is thinner than the upper portion, and which has a portion above the lower edge normally standing in the path of the wall of the receptacle as it is brought into sealing relation to the cap and gasket. The bevel may be longer or shorter than illustrated and the contraction of the thickness of the lower portion of the gasket need not be a true bevel at all, the thing desired in this connection being merely to provide such a shape that the gasket will pass over the mouth of the receptacle to the side wall thereof instead of being forced between the edge of the mouth and the cap.

We have found that with the foregoing arrangement, a seal may be effected which is ample for many purposes even without employing any vacuum, though, as above set forth, the seal is improved by the use of a vacuum.

What we claim as our invention and desire to secure by Letters Patent, is:

In a receptacle closure, the combination of a cap having a depending skirt portion formed with a seat for a gasket below the level of the mouth of the receptacle, and a gasket on said seat and extending to the top of the cap, said gasket having at its inner face a downwardly and outwardly extending beveled portion, the internal diameter of the gasket at its lower portion being greater than the external diameter of the receptacle to which the closure is to be applied, and the said internal diameter above such lower portion being less than the external diameter of said receptacle, said gasket normally prior to application of the cap standing at an angle to its seat in the depending skirt of the cap, and said receptacle at its mouth portion being adapted to pass through said gasket on the application of the cap carrying the gasket.

Signed at New York city, in the county of New York and State of New York, this 17th day of April, A. D. 1918.

ALFRED INGRAM.
HARRY INGRAM.

Witnesses:
ARTHUR MARION,
CHAS. C. GILL.